April 7, 1931. F. CUTTLE ET AL 1,799,457
FISH SCREEN AND APPARATUS FOR REMOVING OBJECTS FROM STREAMS
Filed July 31, 1929 4 Sheets-Sheet 1
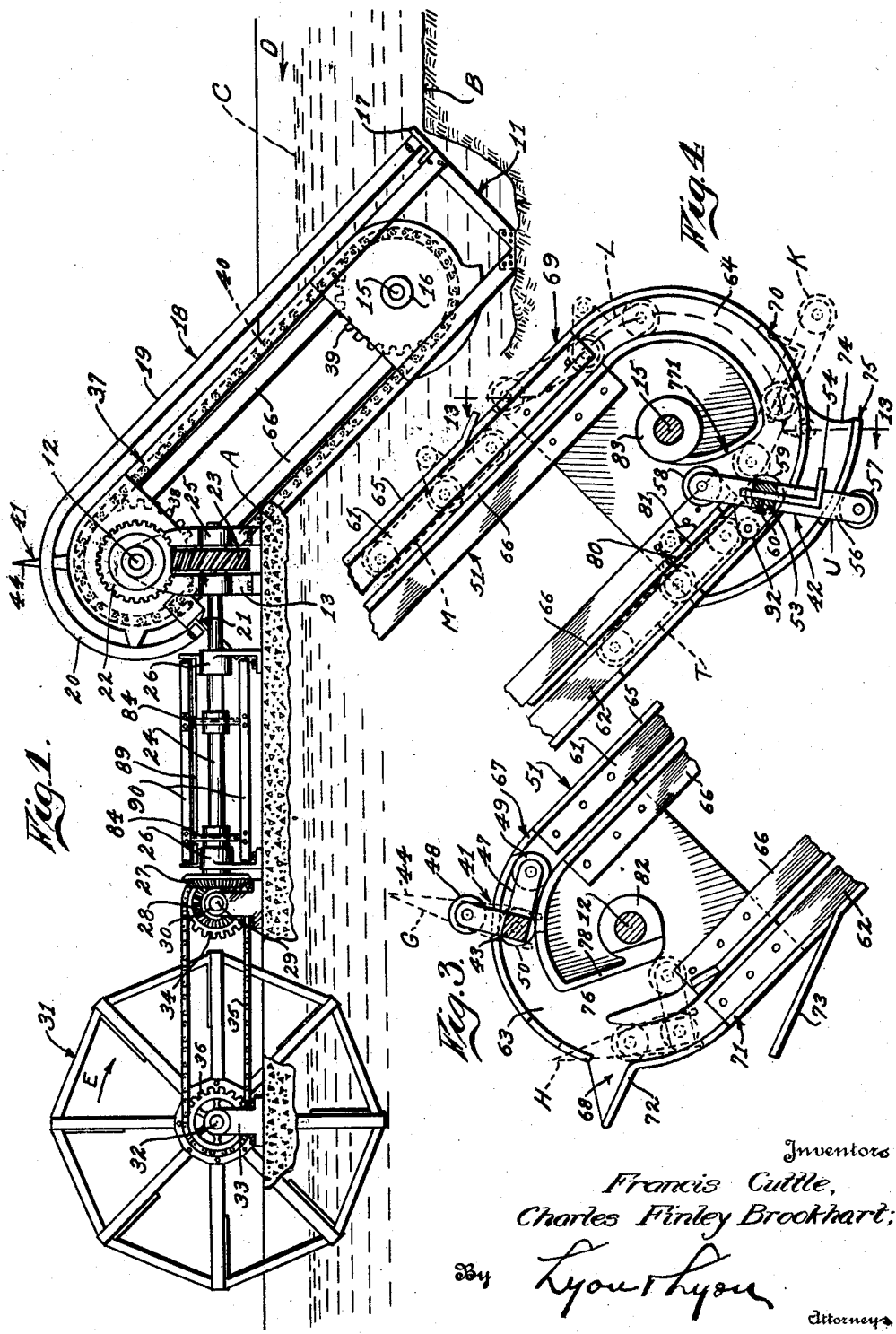

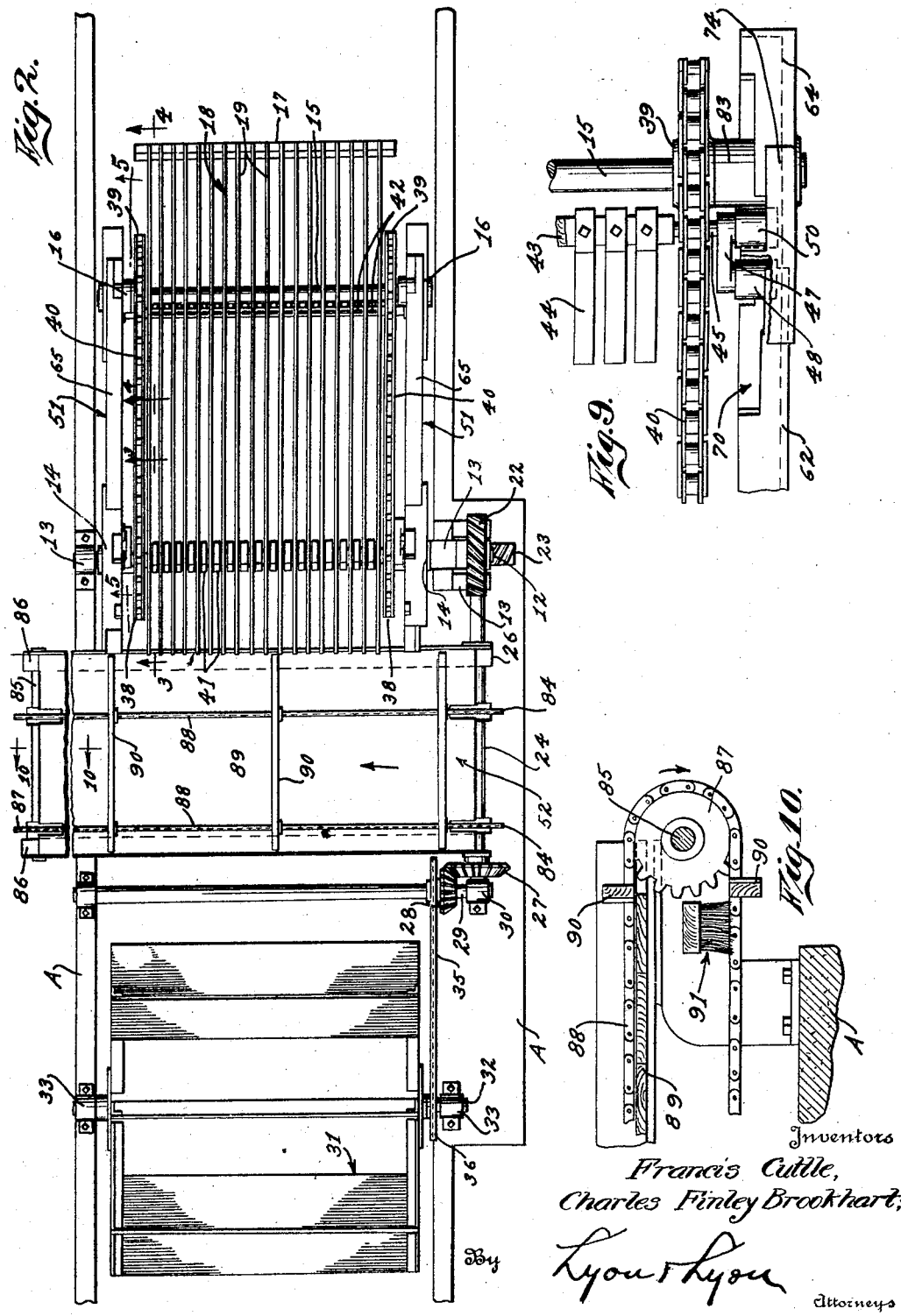

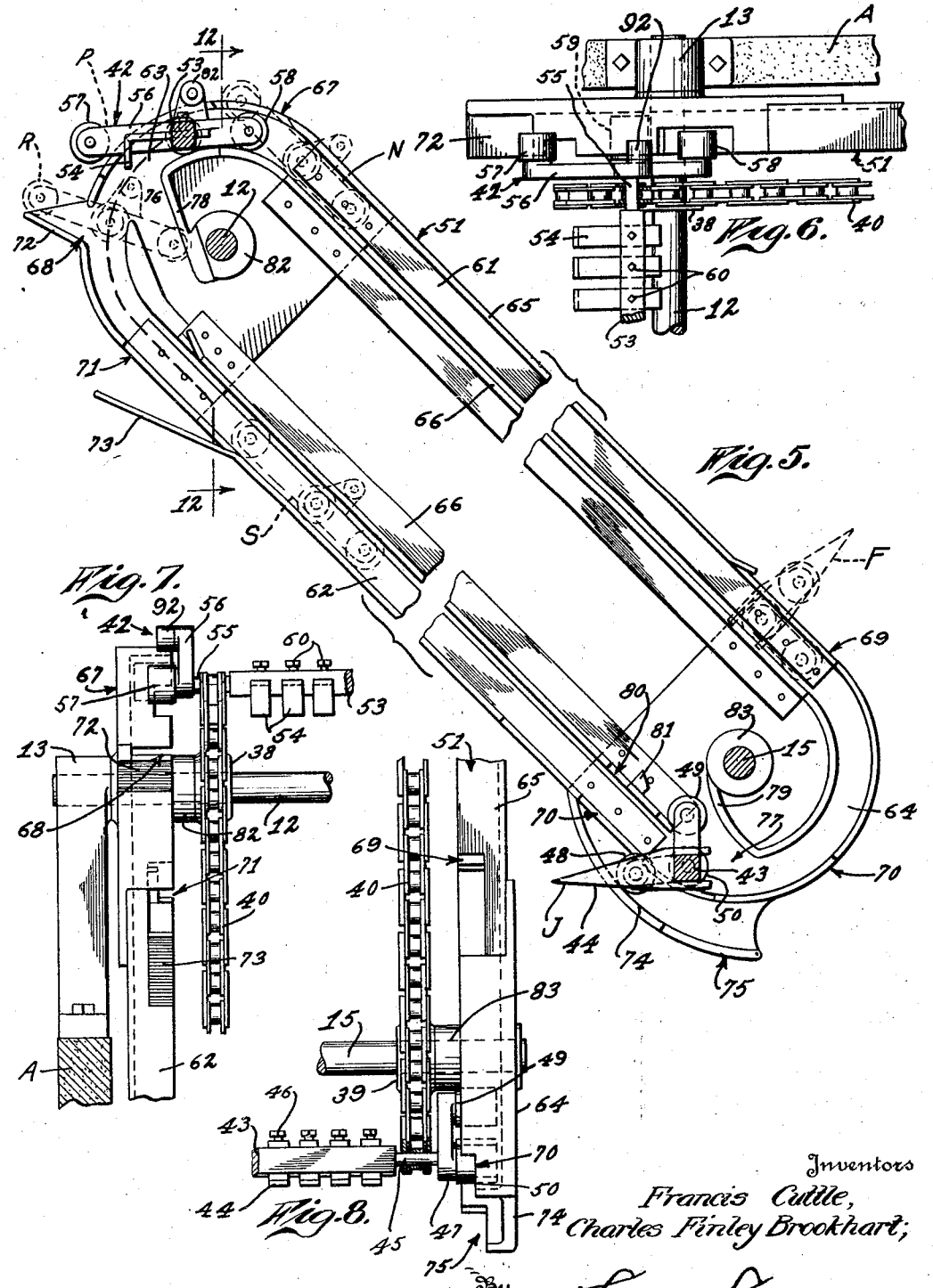

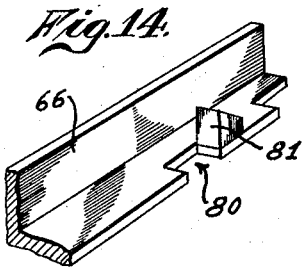
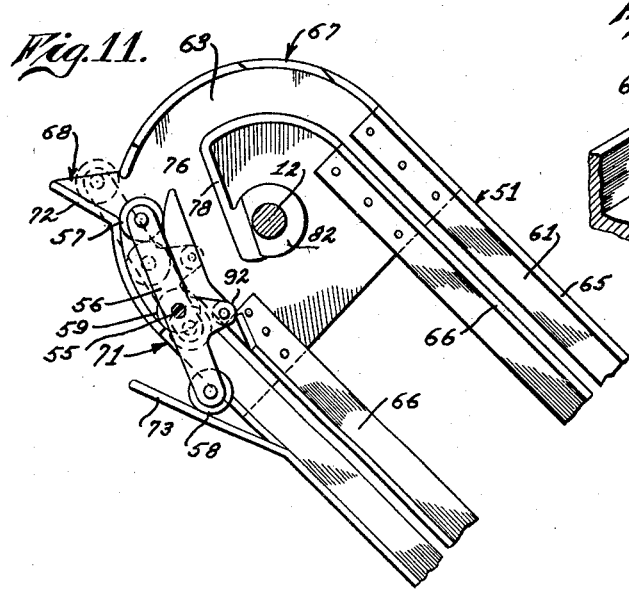
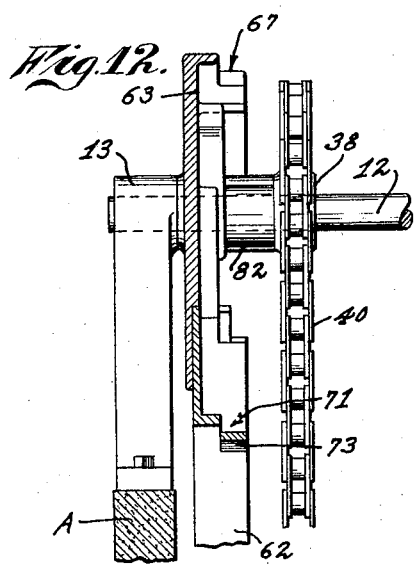
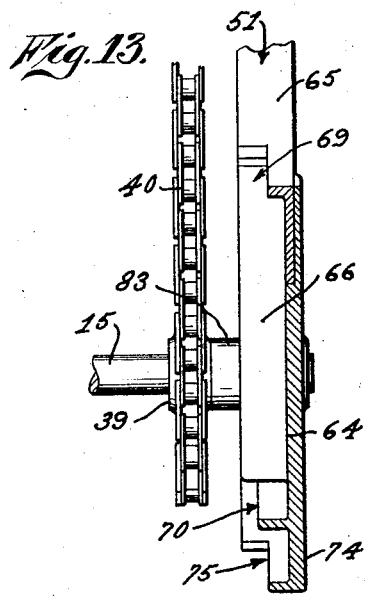

Patented Apr. 7, 1931

1,799,457

UNITED STATES PATENT OFFICE

FRANCIS CUTTLE AND CHARLES FINLY BROOKHART, OF RIVERSIDE, CALIFORNIA

FISH SCREEN AND APPARATUS FOR REMOVING OBJECTS FROM STREAMS

Application filed July 31, 1929. Serial No. 382,481.

This invention relates to apparatus for removing objects from streams and is useful, for example, in removing trash from irrigation streams or ditches.

An object of the invention is to efficiently remove any floating object from a stream, whether the object be afloat on the surface or beneath the surface.

Another very important object is to provied a construction that will insure freedom of the apparatus from clogging with the material that is being removed from the stream.

Another object is simplicity of construction and operation.

Another object is comparative inexpensiveness of construction.

Another object is to make provision for the operation of cleaning fingers to push from the rack moss, weeds and other fine stuff that may tend to clog the rack and interfere with proper operation of the apparatus.

Another object is to provide a construction and arrangement of rack and conveyor, for carrying the material away from the rack, that will insure against the deposit of said material on the main chain of the conveyor.

Other objects and advantages will apear in the subjoined detailed description.

The accompanying drawings illustrate the invention.

Figure 1 is a side elevation of an apparatus constructed in accordance with the provisions of this invention, the same being shown in place in a stream. One wall of the irrigation ditch is partially broken away.

Figure 2 is a plan view of Figure 1.

Figure 3 is an enlarged fragmental view, partly in section, from the line indicated by 3—3, Figure 2.

Figure 4 is an enlarged fragmental view, partly in section, from the line indicated by 4—4, Figure 2.

Figure 5 is an enlarged broken elevation, partly in section, viewed from the line 5—5, Figure 2.

Figure 6 is a fragmental plan view of the upper end of Figure 5.

Figure 7 is a fragmental elevation of the upper end of Figure 5 from the left thereof.

Figure 8 is a fragmental elevation of the lower portion of Figure 5 from the right thereof.

Figure 9 is a fragmental inverted plan view of the lower portion of Figure 5.

Figure 10 is an enlarged fragmental vertical view, partly in section, from the line indicated by 10—10, Figure 2.

Figure 11 is a fragmental view similar to Figure 3, showing the screen cleaner in one position in solid lines and in another position in broken lines.

Figure 12 is a vertical section on the line indicated by 12—12, Figure 5.

Figure 13 is a vertical section on the irregular line indicated by 13—13, Figure 4.

Figure 14 is a fragmental view of one of the cam tracks, showing the abutment therein.

The walls of an irrigation ditch are indicated at A and the bottom thereof at B, and within said ditch is indicated a stream of water C. The direction of flow of the stream C is indicated by the arrow D.

Extending aslant into the irrigation ditch and, in this instance, resting upon the bottom thereof, is a frame 11 of any suitable construction, said frame pivoting about a shaft 12 mounted in bearings 13 that are supported on the sides of the irrigation ditch in any suitable manner. The shaft 12 extends through bearings 14 of the frame 11 so that said frame 11 may be adjusted to any desired angle to permit of the lower end of the frame resting on the bottom of the irrigation ditch.

Near the lower end of the frame 11 is a transversely extending shaft 15 which turns in bearings 16 that are carried by the frame 11. At the lower end of the frame 11 and on the upper side thereof said frame is provided with a cross member 17 to which is secured a rack or slatted screen 18. The slats 19 of the screen 18 extend longitudinally and their upper ends are curved in a semi-circle as indicated at 20. The lower ends of the slats 19 are secured to the cross member 17 and the upper ends of said slats are secured to a cross member 21 which is secured at its opposite ends to the bearings 14. Thus it will be clear that the lower ends of the slats are supported by the lower end of the frame and that the lower end of said frame is supported by the bottom of the irrigation ditch; and it will also be clear that the shaft 12 supports the upper end of the frame which, in turn, supports the upper ends of the slats.

The shaft 12 may be driven by any suitable means and, in the present instance, it is connected by a set of worm wheels 22, 23 to a shaft 24 that is positioned at a right angle to the shaft 12. The shaft 24 turns in bearings 25, 26, all of which are mounted on one edge of the irrigation ditch. The shaft 24 is driven by mitre gears 27, 28 from a shaft 29 that is positioned parallel to the shaft 12. The shaft 29 turns in bearings 30 which are mounted on the upper edges of the irrigation ditch.

In this instance the shaft 29 derives its power from a water wheel 31, of any suitable construction, mounted on a shaft 32 which turns in bearings 33 mounted on the upper edges of the irrigation ditch. The shaft 29 is provided with a sprocket 34 which is connected by a sprocket chain 35 to a sprocket 36 fixed to the shaft 32. The flow of the stream being to the left in Figure 1 causes the water wheel to turn clockwise as indicated by the arrow E, thus causing counter-clockwise rotation of the shaft 12.

The shaft 12 operates an elevator 37 of special construction, said elevator including the screen 18 and the frame 11 that supports said screen. The remainder of the elevator is constructed as follows: Fixed to the shaft 12 are sprockets 38, said sprockets being positioned close to the opposite edges of the screen. In line with the sprockets 38 and fixed to the shaft 15 are other sprockets 39, and endless sprocket chains 40 connect the sprockets 38 with the sprockets 39. Secured at diametrically opposite points to the sprocket chains 40 is an elevator flight 41 and a screen cleaner 42.

The flight 41 is constructed as follows: Secured in any suitable manner, at its opposite ends, to the chains 40 is a bar 43 on which are mounted rake teeth 44. In this instance, the bar 43 has reduced cylindrical end portions 45 which constitute the connecting pins for two pairs of chain links of the chains 40. The rake teeth 44 are constructed to slidably engage the bar 43 and are removably secured to said bar by set screws 46. Secured to each end of the bar 43 is an L-shaped member 47 which carries at its extremities rollers 48, 49 and intermediate of the rollers 48, 49 a third roller 50. Each set of rollers 48, 49, 50 is adapted to co-operate with a cam track, indicated, in general, at 51 so that when the elevator chains are operated, the rake teeth will be given the desired movement to rake objects upwardly along the screen and from said screen onto a transversely extending conveyor 52 that lies between the discharge end of the screen and the water wheel 31.

The screen cleaner 42 is constructed as follows: secured in any suitable manner at its opposite ends to the chains 40, at points that are spaced substantially equal distances from opposite sides of the bar 43, is another cross bar 53 on which are mounted teeth 54. In this particular instance, the end portions 55 of the bar 53 are of cylindrical construction and project through pairs of links of the chains 40 so as to constitute the pins pivotally connecting said links.

Secured to each end of the bar 53 is a straight member 56 carrying at its opposite ends rollers 57, 58 and carrying intermediate of said rollers 57, 58 a third roller 59. Each set of rollers 57, 58, 59 is adapted to co-operate with one of the cam tracks 51 so that movement of the chains 40 will entail that the teeth 54 will move in a prescribed path, as will be made clear hereinafter. The teeth 54 slidably engage the bar 53 and are removably secured to said bar by set screws 60.

There are two cam tracks 51 and, since they are of like construction, a description of one of them will suffice for both, as follows: The cam track 51 is provided with upper and lower straight groove portions 61, 62 and upper and lower curved end groove portions 63, 64 which engage with the opposite ends of the groove portions 61, 62. The outer wall of the cam groove is formed by a flange 65 and the inner wall by a flange 66. The outer flange 65 is provided near its upper end with an opening 67, and near its lower end with openings 69, 70. Also the flange 65 is provided below the opening 68 with another opening 71.

The flange 65 has a portion 72 extending aslant upwardly and outwardly from the lower end of the opening 68 to form an abutment, and said flange is provided with a portion 73 extending aslant upwardly and outwardly from the lower end of the opening 71 to form an abutment. Extending adjacent to a portion of the opening 70 is a curved abutment 74 which is provided with a notch 75.

The flange 66 is provided at its upper end with an opening 76 and at its lower end with an opening 77. The flange 66 has a portion 78 extending aslant inwardly and downwardly from the upper end of the opening 76 to form a guide, and said flangs 66 has a curved portion 79 extending upwardly from the lower end of the opening 77, said portion 79 constituting a guide. The inner flange 66 is provided above the opening 70 with an opening 80 and on one side of said opening with an abutment 81.

The cam tracks 51 are supported by the shafts 12, 15, said cam tracks being provided with upper and lower bearings 82, 83 through which said shafts project.

The cross conveyor 52 includes a shaft 24, sprockets 84 on said shaft, another shaft 85 turning in bearings 86 that are suitably supported at any desired distance from the screen so that the objects removed from the stream will be carried to any desired point of discharge. The cross conveyor 52 also includes sprockets 87 on the shaft 85, endless sprocket chains 88 extending around the sprockets 84, 87, a table 89, and scraper blades 90 connected with the chains 88 and adapted to be operated along the table 89 by movement of the chains 88. The conveyor 52 moves in the direction indicated by the arrow thereon in Figure 2.

Near the discharge end of the conveyor 52, preferably, is provided a brush 91 which is supported above and adjacent to the lower run of the chains 88 so as to engage and brush the upper face of the lower run of said chains, thus to brush from said chains any fine material that may be deposited on and tend to adhere to said chains, while they are moving on their upper runs. It is to be particularly noted that the nearest chain 88 to the screen is spaced a considerable distance away from the discharge end of said screen so that the fine material discharging from said screen will not be deposited on the chain 88 but will be deposited on the table 89 between said chain and the discharge end of the screen, thus to avoid clogging said chain with the material removed from the screen.

The invention operates as follows: Assuming that the water wheel 31 is turning in the direction of the arrow E in Figure 1 and that the parts are arranged as hereinbefore described, the upper runs of the chains 40 will be caused to move upwardly and their lower runs downwardly. Assuming, at the beginning, that the rake teeth 44 are in the position indicated in dotted lines at F in Figure 5, any objects or material of any appreciable size, in the stream, will be lodged upon the upper face of the screen and the rake teeth 44 as they move upwardly will rake the trash from the screen.

The rake teeth 44, while they are moving upwardly, are held in raking position by reason of the rollers 49, 50 riding in the upper cam grooves 61. As the rake teeth 44 pass around the upper end of the screen, they rake practically all of the material from the curved ends of the screen onto the cross conveyor. However, fine material and, especially, grass and moss may tend to collect on and between the upper end portions of the screen bars and hamper the operation of the rake teeth, this being due to the rake teeth being thrust inwardly toward the upper end portions of the screen bars as said rake teeth are being retracted to the position H in Figure 3. Such grass, moss and other fine material that tend to clog the screen will be disposed of as hereinafter described.

To cause the rake teeth to assume the position indicated at H, it will be seen that the roller 48 contacts with the abutment 72, causing the member 47 to turn about the axis of the roller 50. This results in the roller 49 entering the opening 76 and engaging the guide 78. As said roller 49 moves downwardly through the opening 76, the roller 48 passes through the opening 68 into the cam groove and the roller 48 follows the roller 50 which has remained in the cam groove. The rake teeth are now caused to pass downwardly to the position indicated at J in Figure 5, which position is reached by reason of the roller 48 passing through the opening 70 and being guided by the guide 74 while, at the same time, the roller 49 that has run downwardly on the flange 66, passes through the opening 77 so as to again enter the cam groove.

It will be clear from the foregoing that the rollers 49, 50 in the upward movement of the elevator flight 41 traverse the cam grooves while the rollers 48 are outside of said groove and that, in the downward motion of said elevator flight, the rollers 48, 50 traverse the cam grooves while the rollers 49 move outside of said cam grooves. When the teeth 44 move from the position J to the position F, they are being thrust outwardly by the cam action so as to again rake material that meanwhile has been deposited on the upper face of the screen as said material is carried by the stream into contact with the screen. Thus the bar 43, rollers 48, 49, 50, the cam grooves and the endless chains together constitute one form of means operating to move the teeth along the slats and projecting therebetween during a portion of the movement and operating to retract the teeth as they pass along the curved ends of the slats. This insures scraping or wiping of such material as may tend to stick to the teeth from said teeth. The cam tracks and rollers constitute one form of means to alternately rock the bar in different directions as the bar is carried along by the endless driven elements.

By the time the rake teeth 44 have reached their upper positions, the teeth 54 have reached their lower positions and assuming, for example, that the teeth 54 have reached the position shown in solid lines in Figure 4, it will be seen that the roller 58 has rolled downwardly on the flange 65, bringing the parts to the position indicated at T in Figure 4, where shoulders or rollers 92 on the members 56 strike the abutments 81, thus causing the rollers 57 to swing down through the openings 70 and the rollers 58 to swing upward through the openings 77. Then the rollers 58 contact with abutments 771 on the cam tracks, thus to turn the members 56 about the axes of the rollers 58, 59 and force the rollers 58 to follow the rollers 59 into the cam grooves. The rollers 58, 59 now travel in the groove until the cleaner reaches the position indicated in broken lines L in Figure 4. As the cleaner moves from the position indicated at L to the position indicated at M, the roller 57 passes through the opening 69 into the cam groove. Thus, in the position M, all three rollers of each set are running in one of the cam grooves, and they continue thus until the cleaner almost reaches the position indicated at N in Figure 5.

To reach the position N, the roller 57 passes from the groove through the opening 67 so that as the cleaner progresses from the position N to the solid line position P, the teeth 54 are caused to traverse the inter-screen slat spaces, to thereby remove the grass, moss and like fine material that may have collected in said spaces.

The cleaner then progresses to the dotted line position indicated at R, thus bringing the roller 57 into engagement with the inner end portion of the abutment or guide 72. The roller 57 moves outward on the abutment 72, thereby thrusting the teeth outwardly between the screen slats, so as to dislodge any material that may have become caught between the slats. The guide 72 causes the member 56 to turn about the axis of the roller 59, thus causing the roller 57 to pass downwardly through the opening 68 into the cam groove. At the same time the roller 58 is caused to pass through the opening 76, thence downwardly through the opening 71 so as to strike the abutment 73 which guides said roller 58 into the cam groove, thus causing the cleaner to move from the position R to the dotted line position S.

Each of the members 56 is provided with a shoulder 92 adapted, when the cleaner reaches the dotted line position indicated in Figure 4, to engage the abutment 81, to thereby cause the members 56 to pivot about the axes of the rollers 59 so as to cause the cleaner to assume the position indicated in full lines at U in Figure 4, to thereby entail moving of the roller 58 into the opening 77 and the roller 57 downwardly through the opening 74, while the roller 59 remains in the cam groove. From the position U, the cleaner advances to the position indicated at K, thus completing the cycle.

I claim:

1. An apparatus of the character described comprising a frame adapted to extend aslant into a stream, a screen provided with longitudinally extending spaced slats supported on said frame, endless driven elements, means to drive said driven elements, a bar pivotally connected with said elements, teeth on the bar adapted to project between the screen slats, and means to alternately rock the bar clockwise and counter-clockwise as the bar is carried along by the endless driven elements.

2. An apparatus of the character described comprising a frame adapted to extend aslant into a stream, a screen provided with longitudinally extending spaced slats supported on said frame, endless driven elements, means to drive said driven elements, a bar pivotally connected with said elements, teeth on the bar adapted to project between the screen slats, cam tracks, and followers connected with the bar and engaging the cam tracks, said cam tracks constructed to cause clockwise and counter-clockwise turning of the bar to project the teeth at different angles as they are moved by the driven elements.

3. An apparatus of the character described comprising a frame adapted to extend aslant into a stream, a screen mounted on the frame and provided with spaced longitudinally extending slats, the upper end of the screen being elevated, endless driven elements, means to drive said elements, two sets of teeth connected with the endless driven elements, said sets being positioned at different points along said driven elements, cam tracks, a means cooperating with the cam tracks to project the teeth of one set between adjacent screen slats while said set is travelling from the lower end of the screen to near the upper end of said screen, and to thereafter retract said one set beneath the upper end portion of the screen, and means cooperating with the cam tracks to maintain the other set of teeth below the upper face of the screen while said other set is travelling from the lower end of the screen to near the upper end of said screen and to thereafter project the teeth of said other set outwardly between adjacent screen slats to push material that is lodged between said slats out of the screen.

4. An apparatus of the character described comprising a frame adapted to extend aslant into a stream, a screen supported by said frame and provided with spaced longitudinally extending slats, endless driven elements, means to drive said elements, bars pivotally connected at their opposite ends with said elements, teeth on the bars adapted to project between the screen slats, L-shaped members on one of the bars operable to turn said bar about its longitudinal axis, straight members on the other bar operable to turn it about its longitudinal axis, a set of three followers on each of said L-shaped and straight members, and a cam track for said followers provided with a groove and provided with means to alternately move two of the followers of each set to and from the groove at predetermined positions along said groove.

5. An apparatus of the character described comprising a frame adapted to extend aslant into a stream, a screen supported on the frame with its upper end elevated and provided with spaced longitudinally extending slats, endless driven elements, means to drive said elements, bars pivotally connected at their opposite ends with said elements, teeth on said bars in alinement with the inter-slat spaces of the screen, L-shaped members secured at their middle portions to the opposite ends of one of the bars, straight members secured at their middle portions to the opposite ends of the other of said bars, cam tracks provided with grooves, a follower on each end of each of the L-shaped and straight members, a follower on each of said members at its intermediate portion, and means on the cam tracks engageable by some of the followers to cause turning of said members about the axes of the intermediate followers.

6. An apparatus of the character described comprising a frame adapted to extend aslant into a stream, a screen supported by said frame and provided with spaced longitudinally extending slats, endless driven elements, means to drive said elements, bars pivotally connected at their opposite ends with said elements, teeth on the bars adapted to project between the screen slats, bar-actuating members on one of the bars operable to turn said bar about its longitudinal axis, bar-actuating members on the other bar operable to turn it about its longitudinal axis, a set of three followers on each of said bar-actuating members, and a cam track for said followers provided with a groove and provided with means to alternately move two of the followers of each set to and from the groove at predetermined positions along said groove.

7. An apparatus of the character described comprising a frame adapted to extend aslant into a stream, a screen supported on the frame with its upper end elevated and provided with spaced longitudinally extending slats, endless driven elements, means to drive said elements, bars pivotally connected at their opposite ends with said elements, teeth on said bars in alinement with the inter-slat spaces of the screen, bar-actuating members secured at their middle portions to the opposite ends of one of the bars, bar-actuating members secured at their middle portions to the opposite ends of the other of said bars, cam tracks provided with grooves, a follower on each end of each of the bar-actuating members, a follower on each of said members at its intermediate portion, and means on the cam tracks engageable by some of the followers to cause turning of said members about the axes of the intermediate followers.

8. An apparatus of the character described comprising spaced slats extending aslant and provided with downwardly curved upper ends, endless driven elements, means to drive said driven elements, a bar pivotally connected with said elements, teeth on the bar, and means to hold the bar against tilting during a portion of its travel and to cause rocking of the bar in a direction opposite to the direction of travel of the bar while the teeth are adjacent to the curved ends of the slats.

9. An apparatus of the character described comprising spaced slats extending aslant and provided with downwardly curved upper ends, teeth, means operating to move the teeth along the slats, and means operating during a portion of the movement to project the teeth between the slats and operating to move the teeth endwise during movement of the teeth adjacent to the curved ends of the slats.

Signed at Riverside, Calif., this 26th day of July, 1929.

FRANCIS CUTTLE.
CHARLES FINLY BROOKHART.